United States Patent [19]

Dwyer et al.

[11] 4,425,970
[45] Jan. 17, 1984

[54] TRACTOR DRAFT SENSING APPARATUS

[75] Inventors: Robert M. Dwyer, Livonia; Edwin J. Skiba, Sterling Heights, both of Mich.

[73] Assignee: Massey-Ferguson Inc., Detroit, Mich.

[21] Appl. No.: 304,287

[22] Filed: Sep. 21, 1981

[51] Int. Cl.³ .......................................... A01B 63/112
[52] U.S. Cl. ..................................................... 172/7
[58] Field of Search ...................... 172/7, 8, 9, 10, 11, 172/12, 662, 776; 280/446 A

[56] References Cited

U.S. PATENT DOCUMENTS

| 2,675,751 | 4/1954 | Weber | 172/7 |
|---|---|---|---|
| 2,968,353 | 1/1961 | Edman | 172/7 |
| 3,022,830 | 2/1962 | Hess | 172/7 |
| 3,098,528 | 7/1963 | Richey et al. | 172/7 |
| 3,128,830 | 4/1964 | Doering | 172/7 |
| 3,162,247 | 12/1964 | Miller | 172/7 |
| 3,241,620 | 3/1966 | Brudnak | 172/7 |
| 3,314,484 | 4/1967 | Bunting et al. | 172/9 |
| 3,375,876 | 4/1968 | Engelmann | 172/8 X |
| 3,414,062 | 12/1968 | Koenig | 172/7 |
| 3,509,943 | 5/1970 | Schowalter | 172/7 |
| 3,517,747 | 6/1970 | Fischer | 172/7 |
| 3,768,568 | 10/1973 | Pitsch | 172/7 |
| 3,814,188 | 6/1974 | Ahne | 172/7 |
| 4,064,945 | 12/1977 | Haney | 172/4 |
| 4,266,616 | 5/1981 | Mueller, Jr. | 172/7 |

FOREIGN PATENT DOCUMENTS

| 227899 | 4/1960 | Australia . |
|---|---|---|
| 1093604 | 11/1960 | Fed. Rep. of Germany . |
| 1141826 | 12/1962 | Fed. Rep. of Germany . |
| 1209789 | 1/1966 | Fed. Rep. of Germany . |
| 1245855 | 10/1960 | France . |
| 1380800 | 10/1964 | France . |
| 641000 | 7/1962 | Italy . |
| 950566 | 2/1964 | United Kingdom . |
| 1181010 | 2/1970 | United Kingdom . |
| 422367 | 8/1975 | U.S.S.R. . |

OTHER PUBLICATIONS

Bosch EHR System.

Primary Examiner—Richard T. Stouffer
Assistant Examiner—William H. Honaker
Attorney, Agent, or Firm—John C. Thompson

[57] ABSTRACT

A tractor draft sensing apparatus capable of sensing only draft forces. This invention is usable with a tractor provided with draft links (14) and includes a mounting member (30) to which the forward end of the draft links are secured by a mounting pin assembly (26), the mounting member in turn being secured by a support pin assembly (36) to a support plate (34) which is in turn secured to the tractor. The center lines of the mounting pin assembly (26) and the support pin assembly (36) lie in a vertical plane. A spring extends away from the support member and one end of it is disposed between restraining assembly (46). Sensing apparatus (72) are disposed adjacent and outwardly of the restraining assembly and is contacted by one end of a sensing arm (66), the other end of which is secured to the mounting member (30). The foregoing structure cancels deflections imposed by heavy draft loads and causes the sensor (72) to respond only to horizontal draft forces.

10 Claims, 6 Drawing Figures

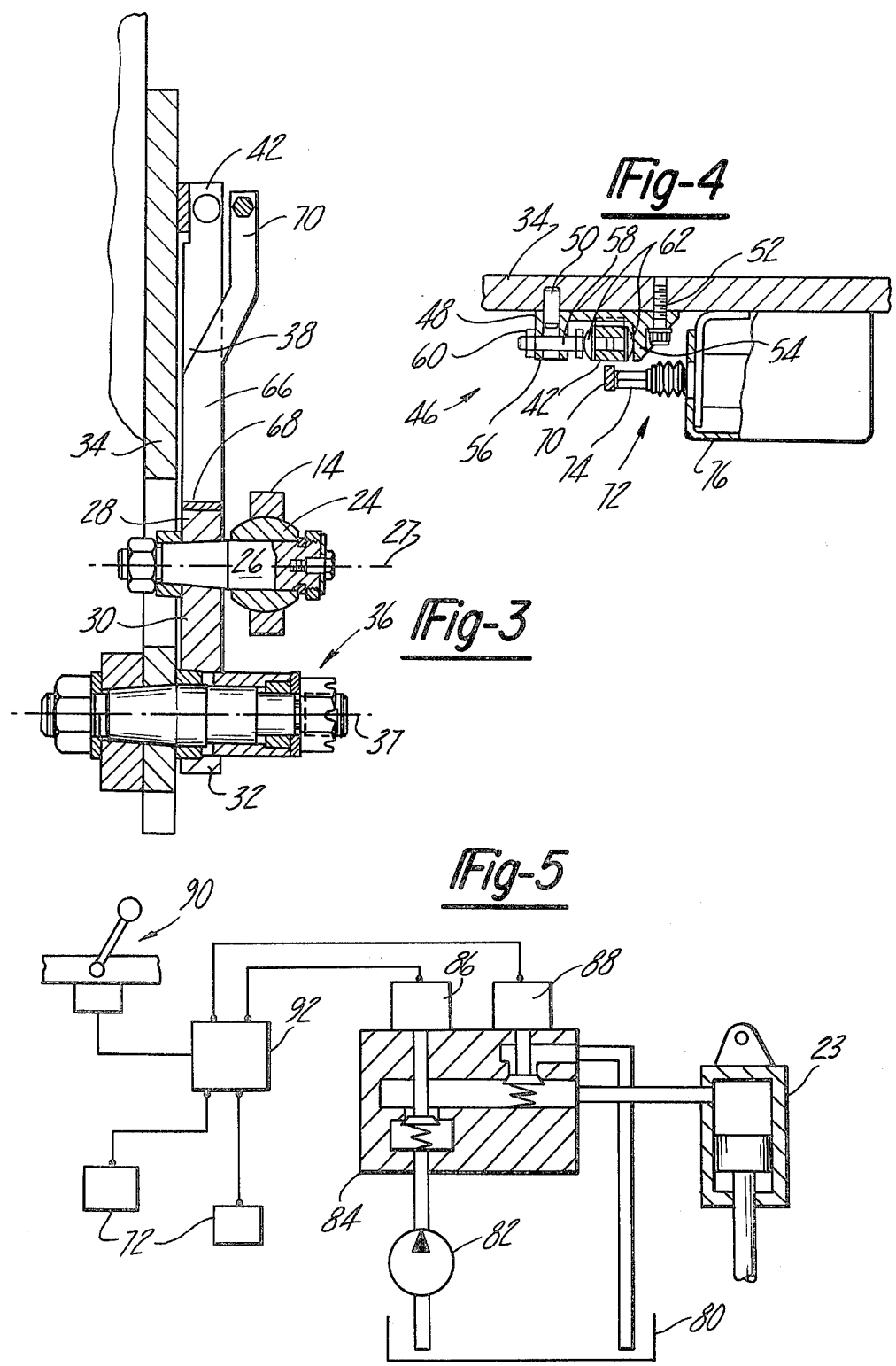

TRACTOR DRAFT SENSING APPARATUS

TECHNICAL FIELD

The present invention relates generally to a tractor draft sensing apparatus, and particularly to one which senses essentially only horizontal draft forces, the draft forces being imposed upon one or more links, each connected at one end to a mounting member which is in turn pivotally interconnected with the tractor, the tractor draft sensing apparatus including a sensing arm which is displaced only in response to horizontal draft forces, which displacement can be measured by an electromechanical transducer.

PRIOR ART

Tractors, particularly the agricultural type, are customarily provided with a power elevatable hitch to which implements may be secured. In accordance with well known principles, the tractor is customarily provided with a draft sensing apparatus which causes the hitch to be incrementally raised during operation when draft loads are increasing, and, in a similar manner, to be lowered when draft loads are decreasing. The loads transmitted to the tractor include both horizontal and vertical force vectors. The prior art has recognized that it is desirable to measure only the horizontal force vectors as this is more properly an indication of the true draft forces being imposed upon an implement drawn behind the tractor. U.S. Pat. No. 4,266,616, issued May 12, 1981 discloses such a system. In the aforementioned patent lower draft links are secured to the outer ends of a cross shaft supported by intermediate bushings, and the horizontal deflections are measured by a centrally located sensor mounted within the tractor.

It has also been proposed in the prior art to utilize a transducer associated with each of the draft links whose draft forces are to be measured. In one such prior art application a beam is cantilevered from the tractor rear axle and each draft link is secured at its forward end to the cantilevered member by a transversely extending pin. A sensor is in turn secured to the tractor and measures the deflection of the cantilevered beam. While the aforementioned design is generally satisfactory, it has been found that when high draft loads are imposed upon the draft links that structural deformations can generate erroneous signals. Thus, the transversely extending pin may deflect, the axle to which the cantilevered beam is secured may deflect, and in addition, there may be deformation of the tractor structure per se to which the sensor is connected, some of these structural deformations being caused by vertical force vectors in addition to those horizontal force vectors which are desired to be measured. It has also been noted with such systems that hysteresis may occur, particularly when operating under high draft load conditions.

OBJECTS AND SUMMARY OF THE INVENTION

It is a principle object of the present invention to provide a draft sensing apparatus capable of measuring only the horizontal draft forces transmitted by a draft link, the tractor draft sensing apparatus being essentially free of hysteresis.

More particularly, it is an object of the present invention to provide a tractor draft sensing apparatus including a draft link, the tractor draft sensing further including sensing means, a mounting member, and restraining means which are all commonly interconnected with the tractor, for example by means of a support plate. The mounting member has one portion which is secured for swinging movement relative to the tractor. The mounting member in addition is provided with a second portion to which the draft link is secured. The center lines of each of the first and second portions of the mounting member are disposed in a plane extending at right angles to the draft forces which are to be measured. The sensing apparatus also includes a sensing spring which has a first portion secured to the mounting member, a second portion of the sensing spring lying in a plane which passes through the center line of the first portion of the mounting member, the second portion of the spring being restrained by the restraining means. The tractor draft sensing apparatus additionally includes a sensing arm connected to the mounting member and having a portion disposed adjacent the restraining means and engaged by the sensor, the sensing means detecting variations of horizontal draft forces transmitted by draft link.

The foregoing will become more apparent after a consideration of the following detailed description taken in conjunction with the accompanying drawings in which preferred forms of this invention are illustrated.

BRIEF DESCRIPTION OF THE FIGURES

FIG. 3 is a section taken generally along the line 3—3 in FIG. 2.

FIG. 4 is a section taken generally along the line 4—4 in FIG. 2.

FIG. 5 is a schematic view illustrating a hydraulic and electrical circuit which may be associated with this invention.

DETAILED DESCRIPTION

Figure 1:
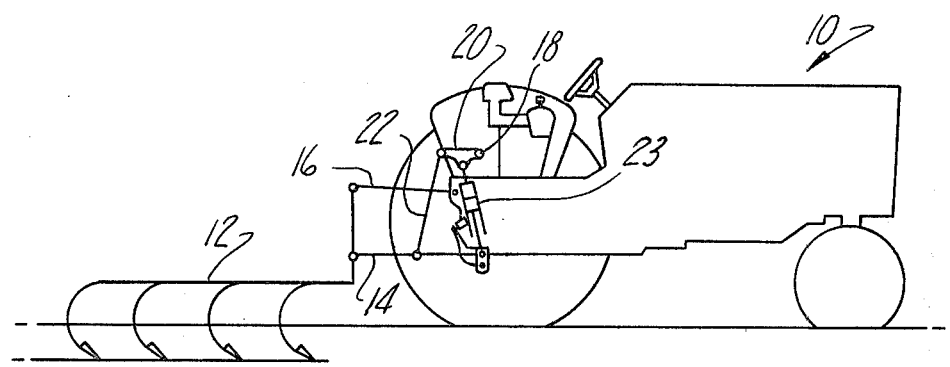
FIG. 1 is an outline of a tractor, hitch and implement combination on which this invention is applied.

Referring first to FIG. 1, the tractor, indicated generally at 10, is shown interconnected with a mounted implement such as a plow 12 by a conventional three point hitch including lower draft links 14 and an upper link 16. The tractor further includes a rock shaft 18 having rearwardly projecting rock arms 20 to which lift links 22 are secured, the lower end of each of the lift links being pivotally interconnected with a mid portion of an associated lower draft link 14. The hitch can be raised and lowered by means of hydraulic cylinder means. In the embodiment illustrated in FIG. 1 there is one hydraulic cylinder 23 associated with each of the rock arms 20, however in some tractors only a single cylinder may be employed. While in FIG. 1 a mounted implement is illustrated, it should also be appreciated that this invention can be employed with semimounted implements which are only secured to the lower draft links.

Figure 2:
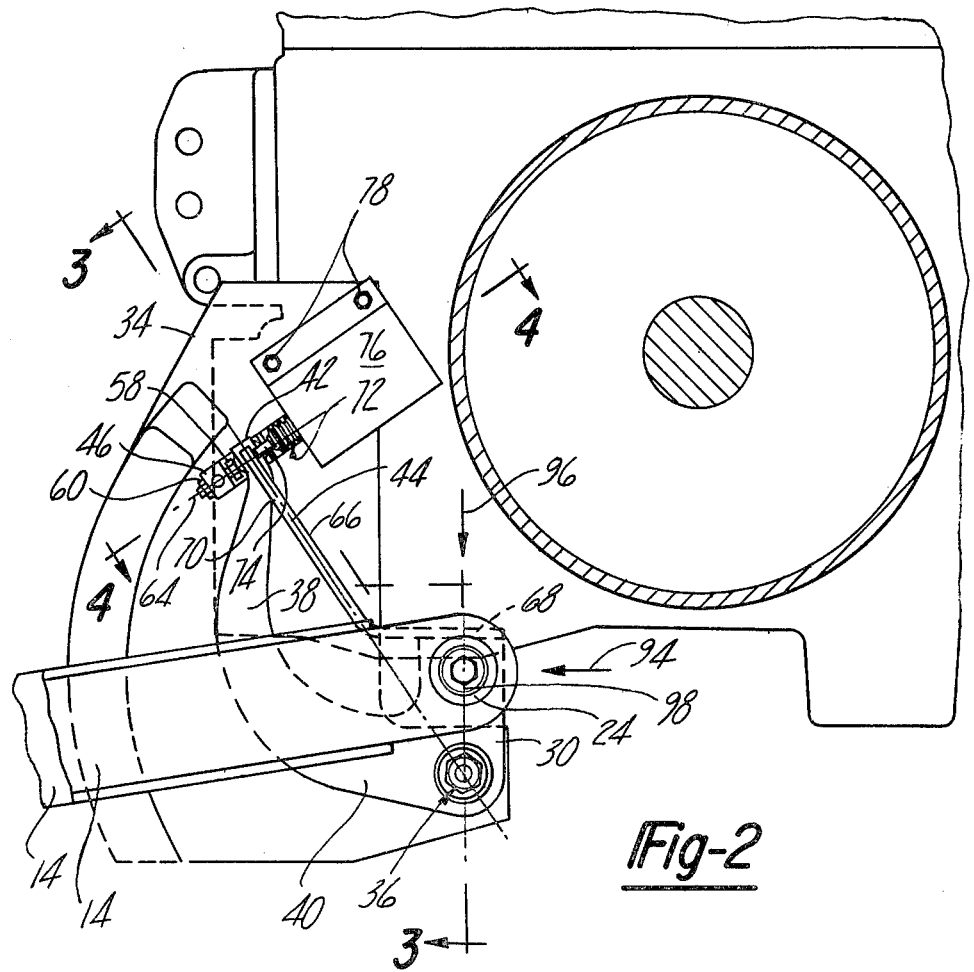
FIG. 2 is an enlarged side view of a portion of the tractor illustrated in FIG. 1 showing the tractor draft sensing apparatus of this invention along with its mounting on the tractor.

Referring now to FIGS. 2-4, a portion of a tractor is illustrated, the tractor being provided with only right and left hand lower links. As the tractor draft sensing apparatus of this invention is the same for each of the lower draft links 14, it will be described in association with the right hand lower draft link, although it should be appreciated that a virtually identical structure will be employed for the left hand lower draft link.

The forward end of the right hand lower link 14 is provided with a ball joint 24 which receives a transversely extending mounting pin assembly 26 (FIG. 3) which is in turn secured in a conventional manner to the upper portion 28 of the mounting member 30. (The mounting pin assembly has a center line 27). A lower portion 32 of the mounting member is in turn secured to a support plate 34 by means of a support pin assembly indicated generally at 36. The center line 37 of the support pin assembly is parallel to the center line 27. A sensing spring 38 is provided, the sensing spring having a first portion 40 which is secured to the mounting member and a second portion 42 which lies in a plane (indicated by line 44) which passes through the center line 37 of the support pin assembly 36. In the embodiment illustrated in FIGS. 2, 3 and 4 the spring 38 is formed integrally with the mounting member 30. This spring is in the form of a leaf spring. In the embodiment illustrated in FIG. 6 (which will be discussed in greater below) the spring (represented by numeral 138) is a separate leaf spring secured to the mounting member (indicated at 130).

Restraining means, indicated generally at 46 (FIG. 4) are provided to permit sliding movement of the leaf spring in the plane 44, but which will restrain movement of the portion 42 of the spring 38 should bend. The restraining means includes a mounting block 48 which is secured to the support plate 34 by means of a locating pin 50 and a cap screw 52. The mounting block has a first shoulder 54, that surface of which facing the second portion 42 of the spring acting as a stop, and a second apertured shoulder 56 into which a bolt 58 is threaded, the head of the bolt acting as a second stop. The bolt is locked into place by a nut 60. While the second portion of the spring could contact the stop surfaces directly, in practice it has been found desirable to provide wear buttons 62 on the spring adjacent the stop, the wear buttons having shank portions which are force fit into an aperture in the second portion 42 of the spring. It should be noted that the pair of stops 54, 58 lie in a plane, indicated by line 64, which is normal to the plane 44.

A sensing arm 66 is provided, one end portion 68 of the sensing arm being secured to the mounting member 30, and the other end portion 70 of the sensing arm being disposed to one side of the second portion 42 of the leaf spring. This portion 70 of the sensing arm is parallel to the portion 42 of the leaf spring and also lies within the plane 44 which extends between the support pin assembly 36 and a location between the stops 54, 58.

A sensing means, indicated generally at 72, is provided, the sensing means being in the form of an electromechanical transducer having an element 74 spring biased into engagement with the portion 70 of the sensing arm. The sensing means is mounted in a housing 76 which is in turn secured to the support plate 34 by means of cap screws 78. Referring now to FIG. 5 a simplified circuit is illustrated with which the tractor draft sensing apparatus of this invention may be utilized. The tractor is provided with a reservoir 80, customarily within the tractor center housing to which the support plate 34 is mounted, and a pump 82. The pump can direct fluid to a draft control valve block 84 (as well as to other functions of the tractor). The valve block is provided with internal valves which are controlled by solenoid actuators 86, 88 to cause the cylinder 23 to either extend, be maintained in a constant position, or to retract under the weight of the implement, the fluid being returned to reservoir 80 when the cylinder is retracting. The desired draft load can be set by the tractor operator by means of a control mechanism indicated generally at 90, which mechanism transmits a control signal to a processor indicated at 92. The processor also receives the draft signals from the sensing means 72 and in turn transmits an output signal to the solenoids 86, 88.

Operation: It should be appreciated that when the tractor is propelled in a forward direction with the implement 12 in the ground that the mounting pin assembly 36 will be subjected to various forces. These forces consist of a horizontal component, indicated by the arrow 94, and a vertical component, indicated by the arrow 96. As it is desirable to measure only the horizontal forces, the pin assemblies 36, 26 are disposed in a vertically extending plane indicated by line 98 and defined by center lines 27, 37. Thus, it can be seen that the first and second portions 32, 28, respectively are disposed in a plane extending at right angles to the draft forces to be measured. Therefore, vertical forces, indicated by the arrow 96, will not cause the spring to bend, whereas horizontal forces, indicated by the arrow 94, will cause the spring to bend, the spring 38 resisting movement of the mounting member as it tends to pivot about the support pin assembly 36. However, it should be appreciated that as the mounting member is caused to move against the action of the spring 38 that the end 70 of the sensing arm will move causing a signal to be generated by the sensing means 72 which is subsequently processed by the processor 92 to cause raising and lowering of the implement. It should also be noted that the normally heavy loads imposed upon the links 14 will cause deflection of the various components, for example deflection of the support pin assembly 36, bending of pin 26, and even bending of the mounting member relative to the pins 26 and 36. As only the horizontal force 94 will cause the spring to bend the sensor will move only when this bending occurs. Therefore, either movements or deflections of the mounting apparatus do not cause the sensor to move in the plane 64 and therefore the sensor more accurately measures horizontal forces.

Figure 6:
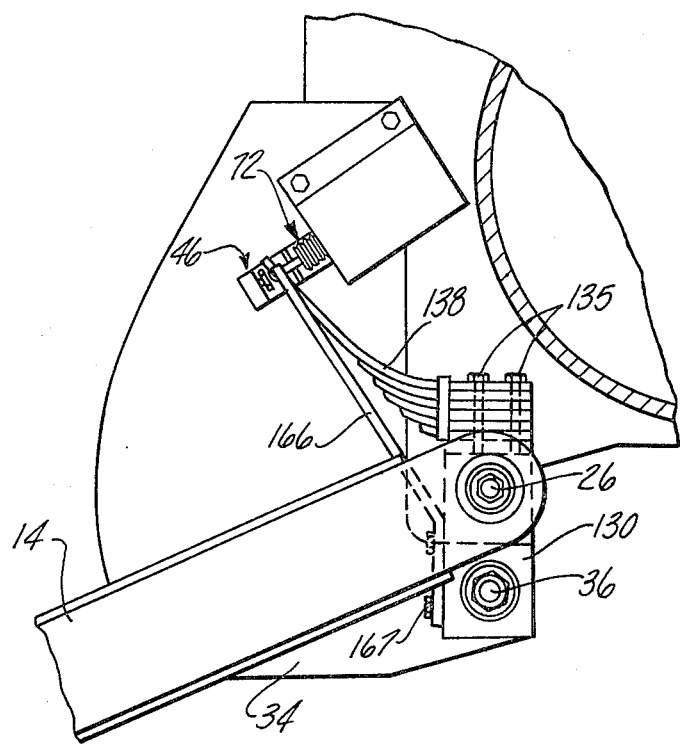
FIG. 6 shows an alternate modification of the invention illustrated in FIGS. 2-4.

Reference will now be made to FIG. 6 in which an alternate design is illustrated. In this design the mounting member and spring are not integral but are formed of separate pieces. Thus, the mounting member 130 is secured to the support plate 34 by a support pin assembly 36 and the draft link 14 is secured to an upper portion of the mounting member by means of a mounting pin assembly 26. Secured to an upper and of the mounting member 130 by means of bolts 135 is a leaf spring assembly 138. The end of the leaf spring assembly 38 remote from the mounting member 130 is confined between the stops on the restraining means 46 and lies in a plane which passes through the axis of the support pin assembly 36. A sensing arm 166 is also provided which is secured to one side of the mounting member by means of conventional fasteners 167. This device will also function in essential the same manner as the embodiment illustrated in FIGS. 2-4.

While preferred forms have been disclosed above, it should be appreciated that other variations may occur for those having ordinary skill in the art. Therefore, it is to be understood that the invention is not to be limited to the particular details, shown and described above, but that, in fact, widely different means may be employed in the practice of the broader aspects of this invention.

What is claimed is:

1. A tractor draft sensing apparatus capable of sensing only draft forces, said tractor draft sensing apparatus comprising
    a draft link for connecting an implement to a tractor and capable of transmitting the draft forces to be measured to the tractor;
    sensing means interconnected with the tractor and capable of sensing movement of a member and generating a draft signal in response to said movement;
    a mounting member having a first portion which is interconnected with the tractor for swinging movement relative to the tractor, said mounting member having a second portion to which the draft link is secured, the first and second portions of the mounting member being disposed in a plane extending at right angles to the draft forces to be measured;
    a sensing spring formed integrally with the mounting member, said sensing spring being a leaf spring;
    restraining means interconnected with the tractor and engaging another portion of the sensing spring at a location remote from the portion attached to the mounting member, said restraining means permitting nonbending movement of said another portion of the sensing spring; and
    a sensing arm connected to the mounting member and having a portion disposed adjacent the restraining means, said portion of the sensing arm being engaged by the sensing means whereby variations of the draft forces to be measured transmitted by the draft link are detected by the sensing means.

2. The tractor draft sensing apparatus set forth in claim 1 wherein the restraining means is a pair of stops disposed on opposite sides of a portion of the leaf spring.

3. The tractor draft sensing apparatus set forth in claim 1 further characterized by the provision of a support plate mounted on the tractor, the sensing means, the restraining means, and the mounting member being mounted on the support plate.

4. The tractor draft sensing apparatus set forth in claim 3 in which the mounting member is mounted on the support plate by a support pin assembly.

5. The tractor draft sensing apparatus set forth in claim 6 in which the draft link is secured to the mounting member by a ball joint assembly, the center line for the support pin assembly and the mounting pin assembly lying in a common vertical plane.

6. The tractor draft sensing apparatus set forth in claim 4 or claim 5 wherein the restraining means is a pair of outwardly extending stops, and in which the sensing spring is a leaf spring having a portion disposed between the restraining stops.

7. The tractor draft sensing apparatus set forth in claim 6 in which said portion of the sensing arm is disposed to one side of the leaf spring at a location between and outwardly of the restraining stops.

8. The tractor draft sensing apparatus set forth in claim 6 in which said portion of the leaf spring lies in a plane which passes through center line of said support pin assembly, and said pair of stops lie in a plane normal to the plane of said portion of the leaf spring.

9. The tractor draft sensing apparatus set forth in claim 8 in which said portion of the sensing arm is disposed outwardly of said restraining stops and lies in a plane parallel to said portion of said leaf spring.

10. The tractor draft sensing apparatus set forth in claim 1 or claim 9 wherein the sensing means is an electromechanical transducer.

* * * * *